United States Patent
Vivanco

(10) Patent No.: US 12,369,125 B2
(45) Date of Patent: Jul. 22, 2025

(54) UPLINK POWER CONTROL ADJUSTMENT FOR AERIAL USER EQUIPMENT SERVICED BY TERRESTRIAL BASED ADVANCED NETWORK EQUIPMENT

(71) Applicant: AT&T Technical Services Company, Inc., Vienna, VA (US)

(72) Inventor: Daniel Vivanco, Ashburn, VA (US)

(73) Assignee: AT&T Technical Services Company, Inc., Vienna, VA (US)

(*) Notice: Subject to any disclaimer, the term of this patent is extended or adjusted under 35 U.S.C. 154(b) by 700 days.

(21) Appl. No.: 17/662,575

(22) Filed: May 9, 2022

(65) Prior Publication Data
US 2023/0362825 A1 Nov. 9, 2023

(51) Int. Cl.
*H04W 52/14* (2009.01)
*H04W 52/36* (2009.01)
*H04W 68/00* (2009.01)
*H04W 84/06* (2009.01)

(52) U.S. Cl.
CPC ....... *H04W 52/146* (2013.01); *H04W 52/367* (2013.01); *H04W 68/005* (2013.01); *H04W 84/06* (2013.01)

(58) Field of Classification Search
CPC ... H04W 8/245; H04W 88/02; H04W 52/325; H04W 52/146; H04W 52/367; H04W 68/005; H04W 84/06; H04B 17/336
See application file for complete search history.

(56) References Cited

U.S. PATENT DOCUMENTS

| 5,805,076 A | * | 9/1998 | Ito | H04W 68/00 455/68 |
| 2006/0116154 A1 | * | 6/2006 | Han | H04W 52/16 455/522 |
| 2010/0067496 A1 | * | 3/2010 | Choi | H04W 52/54 370/336 |
| 2016/0081036 A1 | * | 3/2016 | Luo | H04W 72/0473 370/329 |
| 2018/0367386 A1 | * | 12/2018 | Liao | H04L 5/0053 |
| 2020/0396715 A1 | * | 12/2020 | Wei | H04W 76/27 |

(Continued)

FOREIGN PATENT DOCUMENTS

| JP | 2002135826 A | * | 5/2002 | |
| KR | 101739980 B1 | * | 5/2017 | |
| WO | WO-2019028865 A1 | * | 2/2019 | ............. G05D 1/106 |

OTHER PUBLICATIONS

"Study on enhanced LTE support for aerial vehicles," RP-170779, NTT DOCOMO, Ericsson, Mar. 2017, http://www.3gpp.org/ftp/tsg_ran/tsg_ran/TSGR_75/Docs/RP170779.zip, Accessed on Mar. 8, 2022, 4 pages.

*Primary Examiner* — Dung Hong

(57) ABSTRACT

An architecture to provide uplink power control adjustment for aerial user equipment. A method can comprise receiving report data from serving cell equipment, wherein the report data comprises an adjustment in a transmission gain value initiated by the serving cell equipment, based on the adjustment in the transmission gain value, sending, via the serving cell equipment, paging message data to a group of aerial user equipment, and based on the paging message data, instructing the group of aerial user equipment to read newly broadcast signaling messages from serving cell and update their own uplink power control mechanism.

20 Claims, 15 Drawing Sheets

(56) References Cited

U.S. PATENT DOCUMENTS

2020/0413369 A1* 12/2020 Wei .................. H04W 72/30
2022/0330201 A1* 10/2022 Hwang ............. H04W 72/1273
2024/0284456 A1*  8/2024 Elkotby ............. H04W 76/19

* cited by examiner

900 ↴

```
System Information Block 2

Time : 08:47:48.510
radioResourceConfigCommon
  rach-ConfigCommon
    numberOfRA-Preambles : n52
    sizeOfRA-PreamblesGroupA : n28
    messageSizeGroupA : b56
    messagePowerOffsetGroupB : dB10
    powerRampingStep : dB2
    preambleInitialReceivedTargetPower : dBm-104
    preambleTransMax : n10
    ra-ResponseWindowSize : sf10
    mac-ContentionResolutionTimer : sf64
    maxHARQ-Msg3Tx : 5
  bcch-Config
    modificationPeriodCoeff : n2
  pcch-Config
    defaultPagingCycle : rf128
    nB : oneT
  prach-Config
    rootSequenceIndex : 120
    prach-ConfigInfo
      prach-ConfigIndex : 5
      highSpeedFlag : False
      zeroCorrelationZoneConfig : 11
      prach-FreqOffset : 6
  pdsch-ConfigCommon
    referenceSignalPower : 18
```

```
SystemInformationBlockType1      (3GPP TS 36.331 ver 11.12.0 Rel 11)

BCCH-DL-SCH-Message
  message
    c1
      systemInformationBlockType1                SIB-1
        cellAccessRelatedInfo
          plmn-IdentityList
            plmn-IdentityList value 1
              plmn-Identity
                mcc
                  mcc value   : 3, 1, 0
                mnc
                  mnc value   : 4, 1, 0
            cellReservedForOperatorUse       : notReserved
          trackingAreaCode
            Bin : 12 11  (= 4625)
          cellIdentity
            Bin : 9F A2 71 0 (= 167388944)
          cellBarred      : notBarred
          intraFreqReselection  : allowed
          csg-Indication       : false
        cellSelectionInfo
          q-RxLevMin   : -61  (= -122 dBm)
        p-Max   : 23
        freqBandIndicator       : 17
        schedulingInfoList
          schedulingInfoList value 1
            si-Periodicity     : rf16
            sib-MappingInfo
              sib-MappingInfo value      [ sibType3 ]
          schedulingInfoList value 2
            si-Periodicity     : rf64
            sib-MappingInfo
              sib-MappingInfo value      [ sibType5, sibType6 ]
        si-WindowLength : ms20
        systemInfoValueTag      : 29
        nonCriticalExtension
          lateNonCriticalExtension
            SystemInformationBlockType1-v8h0-IEs
              multiBandInfoList
                multiBandInfoList value : 12
          nonCriticalExtension
            ims-EmergencySupport-r9    : true
            nonCriticalExtension
```

FIG. 11

UPLINK POWER CONTROL ADJUSTMENT FOR AERIAL USER EQUIPMENT SERVICED BY TERRESTRIAL BASED ADVANCED NETWORK EQUIPMENT

TECHNICAL FIELD

The disclosed subject matter relates to uplink power control adjustment for aerial user equipment (aerial UE) or unmanned aerial vehicles (UAVs) serviced by terrestrial based advanced network equipment, such as, but not limited to, long term evolution (LTE) and/or fifth-generation (5G) network equipment.

BACKGROUND

Wireless operators can use terrestrial cellular network equipment, such as long-term evolution (LTE) and/or fifth-generation (5G) core mobile network operator (MNO) equipment to provide services to aerial UE or UAVs. Aerial user equipment UE can have multiple use cases (e.g., delivery, monitoring, . . . ). Wireless operators can have aerial coverage maps, which can indicate areas with and without cellular coverage. In addition, unmanned aerial vehicles (UAVs), such as aerial UE, can scan neighbor equipment signal pilots (e.g., reference signal received power (RSRP) measurement values) to determine whether they can fly in a given direction.

BRIEF DESCRIPTION OF DRAWINGS

FIG. 9 depicts an example system information block used to provide uplink power control adjustment for aerial UE or UAVs serviced by terrestrial based advanced network equipment, in accordance with aspects of the subject disclosure.

FIG. 11 depicts a further example system information block used to provide uplink power control adjustment for aerial UE or UAVs serviced by terrestrial based advanced network equipment, in accordance with aspects of the subject disclosure.

DETAILED DESCRIPTION

Figure 1:
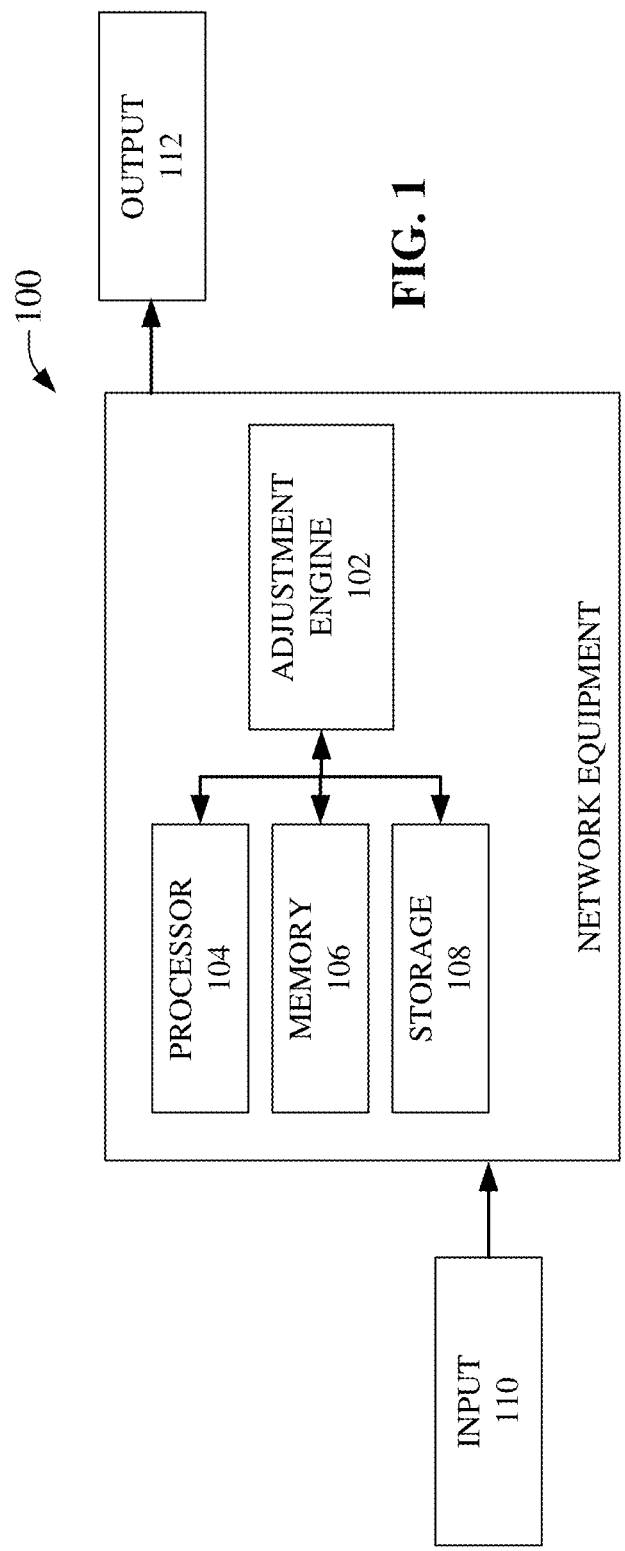
FIG. 1 is an illustration of a system that provides uplink power control adjustment for aerial user equipment (aerial UE) or unmanned aerial vehicles (UAVs) serviced by terrestrial based advanced network equipment, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

The disclosed subject matter, in accordance with various embodiments, provides a system, apparatus, equipment, or device comprising: a processor (and/or one or more additional processors), and a memory (and/or one or more additional memories) that stores executable instructions that, when executed by the processor, facilitate performance of operations. The operations can comprise receiving report data from serving cell equipment, wherein the report data comprises a change in a transmission gain value associated with the serving cell equipment, based on the change in the transmission gain value, transmitting, via the serving cell equipment, paging message data to a group of unmanned aerial vehicles, and based on the paging message data, instructing the group of unmanned aerial vehicles to revise an operational parameter associated with operating within a broadcast coverage area provided by the serving cell equipment and/or update uplink power control mechanisms used by the group of unmanned aerial vehicles to communicate with the serving cell equipment.

The group of unmanned aerial vehicles can be serviced by the serving cell equipment. Further, serving cell equipment can be special serving cell equipment associated with a collection of up tilted antennas. The special serving cell equipment can also be dedicated to servicing the unmanned aerial equipment, and capable of transmitting, using the up tilted antenna, at a transmission power values approaching 100 Watts. Also, the special serving cell equipment can be capable of adjusting the transmission gain value from a first transmission gain value to a second transmission gain value.

Additionally, the special serving cell equipment can comprise groups of amplifiers implemented in a cascade mode. Moreover, in response to the transmission gain value being set to a maximum value, the broadcast umbra cast by the special serving cell equipment to service the unmanned aerial vehicle can be increased to cover a greater geographic coverage area, conversely, in response to the transmission gain value being set to a minimum value, the broadcast penumbra cast by the special serving cell equipment to service the unmanned aerial vehicle is decreased to cover a smaller geographic coverage area.

Additional operations that can be performed by the foregoing system can comprise determining that the unmanned aerial vehicle is located at a peripheral edge of the broadcast coverage area cast by the serving cell equipment, and increasing, by the serving cell equipment, the transmission gain value to a maximum transmission gain value, and determining that the unmanned aerial vehicle is situated at a central portion of the broadcast coverage area cast by the serving cell equipment, and decreasing, by the serving cell equipment, the transmission gain value to a minimum transmission gain value.

In regard to the foregoing, the group of unmanned aerial vehicles each can utilize an autonomous uplink power mechanism to communicate with the serving cell equipment, wherein the autonomous uplink power mechanism estimates a path loss between each unmanned aerial vehicle of the group of unmanned aerial vehicles and the serving cell equipment based on a broadcast signaling message received from the serving cell equipment. Further, the uplink power control mechanism utilized by each unmanned aerial vehicle of the group of the unmanned aerial vehicles can allow for a transmission of a waveform from each unmanned aerial vehicle to the serving cell equipment. Additionally, transmission of the paging message data by the serving cell equipment to each unmanned aerial vehicle of the group of unmanned aerial vehicles requires each unmanned aerial vehicle to read newly broadcast signaling messages transmitted from the serving cell equipment and requires each unmanned aerial vehicle to update the uplink power control mechanism associated with each unmanned aerial vehicle.

In accordance with further embodiments, the subject disclosure describes methods and/or processes, comprising a series of acts that, for example, can include: receiving, by a device comprising a processor, report data from serving cell equipment, wherein the report data comprises a change in a transmission gain value associated with the serving cell equipment, based on the change in the transmission gain value, transmitting, by the device, via the serving cell equipment, paging message data to a group of unmanned aerial vehicles, and based on the paging message data, instructing, by the device, the group of unmanned aerial vehicles to change an operational parameter associated with operating within a broadcast coverage area provided by the serving cell equipment.

In accordance with the foregoing, the serving cell equipment can provide dedicated service to the group of unmanned aerial vehicles. Also, the serving cell equipment can be associated with a collection of up tilted antennas, that can be dedicated to providing service to the group of unmanned aerial vehicles. The serving cell equipment can be capable of transmitting, using up tilted antennas, at a transmission power value of at least 100 Watts. Further, the special serving cell equipment can be capable of adjusting the transmission gain value from a first transmission gain value to a second transmission gain value.

In accordance with still further embodiments, the subject disclosure describes machine readable media, a computer readable storage devices, or non-transitory machine readable media comprising instructions that, in response to execution, cause a computing system (e.g., apparatus, equipment, devices, groupings of devices, etc.) comprising at least one processor to perform operations. The operations can include: receiving report data from serving cell equipment, wherein the report data comprises an adjustment in a transmission gain value initiated by the serving cell equipment, based on the adjustment in the transmission gain value, sending, via the serving cell equipment, paging message data to a group of aerial user equipment, and based on the paging message data, instructing the group of aerial user equipment to revise an operational parameter.

In the foregoing context, the serving cell equipment can be a special serving cell equipment comprising a group of amplifiers implemented in a cascade mode, and wherein the serving cell equipment in response to the transmission gain value being set to a maximum value, a broadcast umbra cast by the serving cell equipment to service the aerial user equipment can be increased to cover a greater geographic coverage area.

Wireless mobile network operator entities (MNOs) can use terrestrial cellular network equipment, such as long-term evolution (LTE) and/or fifth-generation (5G) core mobile network operator (MNO) equipment (e.g., serving cell equipment, base station equipment, access point equipment, internet of things (IoT) equipment, picocell equipment, femtocell equipment, and/or other similar and pertinent equipment) to provide services to aerial UE. Aerial UE can have multiple use cases (e.g., delivery, monitoring, . . . ). Wireless MNOs can have aerial coverage maps, which can indicate areas with and/or without cellular coverage. In addition, unmanned aerial vehicles (UAVs), such as aerial UE, can scan neighbor equipment signal pilots (e.g., reference signal received power (RSRP) measurement values) to determine whether it can fly in a given direction. In instances where signal pilots are not detectable in a direction in which a UAV is traversing, the UAV can change or adjust its trajectory to better align with cellular coverage where appropriate signal pilots are more evident.

The subject disclosure provides for detecting and/or identifying UE based, for example, on international mobile subscriber identifier (IMSI) values, or subscriber identity module or subscriber identification module (SIM) values (e.g., one or more integrated circuits that can securely store subscriber identification values and related key values and that can be used to identify and authenticate subscriber UE).

In various embodiments, approaching UE can be identified based on other subscriber or subscription data, such as unique UE serial number values, governmentally issued unique identification values (e.g., federal aviation administration tag values), UE manufacturer serial number values, unique visual identification values affixed to UE, unique identification values rendered perceivable using, for example, irradiated ultra-violet light, and/or unique identification values rendered observable, for instance, through illumination using infra-red light.

In other embodiments, identification of approaching UE can be facilitated using one-dimensional and/or multi-dimensional scanning technologies and barcode symbology, such as universal product codes (UPCs), matrix bar codes (e.g., quick response (QR) codes) comprising machine-readable optical labels, and the like that can include information about the equipment to which it is attached.

In one or more embodiments, having identified and/or detected an approaching UE, the detected UE can be monitored and tracked to determine whether or not the approaching UE is on a trajectory that may bring the UE within the broadcast ambit of serving cell equipment. In order to determine whether or not the approaching UE may be on a trajectory that may bring it within the broadcast coverage area of serving cell equipment, artificial intelligence technologies, neural networking architectures, collaborative filtering processes, machine learning techniques, and/or big data mining functionalities can be utilized, wherein, for example, probabilistic determinations based at least in part on cost benefit analyses (e.g., the cost of taking a particular action is weighed against the benefit of taking the particular action, wherein in response to determining that the benefit associated with the action outweighs the cost associated with the action, the action is identified as an action worthy of consideration and implementation) can be undertaken. In additional and/or alternative other embodiments, artificial intelligence technologies, neural networking architectures, collaborative filtering processes, machine learning techniques, Bayesian belief systems, big data mining and data analytic functionalities, and the like, can be employed, wherein, for example, multi-objective optimization (e.g., Pareto optimization) can be used to determine whether or not an action should be initiated and implemented. Multi-objective optimization can ensure that first actions or groups of first actions can only be implemented provided that other second actions or groups of other second actions are not detrimentally affected.

In example embodiments, in order to track UE entering and/or exiting the control and/or the monitoring ambits (e.g., processes in execution), one or more global navigation satellite system (GNSS) equipment can be used that can provide geolocation and/or time information to global positioning satellite (GPS) equipment (e.g., transmitter and/or receiver equipment) anywhere on or near the earth where there is an unobstructed line of sight to the one or more GNSS equipment, such as one or more GPS satellites in various earth orbits. Additionally and/or alternatively, other triangulation processes can be used to keep track of UE. For instance, in various embodiments, ranges (e.g., variable distances) can be determined by targeting UE with light amplification by stimulated emission of radiation (e.g., laser) and measuring the time for the reflected light to return to one or more receiver (e.g., lidar) can be used to track UE approaching and/or entering into a determined vicinity of a restricted area. In a similar manner, a detection system that uses radio waves to determine the range, angle, or velocity of objects (e.g., radar) can be used to determine whether or not UE are approaching and/or entering into the determined vicinity of the restricted area. Other mechanisms to track UE can also include using multilateration (e.g., determining UE position based on the measurement of the times of arrival (TOA) of one or more energy wave (e.g., radio, acoustic, seismic, etc.) having known waveforms and/or speed when propagating either from and/or to multiple emitters and/or receivers of the waves) between one or more network equipment (e.g., serving cell equipment, base station equipment, internet of things (IoT) equipment, picocell equipment, femtocell equipment, and similarly functional equipment). In some instances, a UE's returned signal strength values to various antennae associated with the one or more network equipment can be used to triangulate and provide a positional reference as to the trajectory of an individual UE. In additional and/or alternative instances, timing advance (TA) processes can be used as a measure of TOA. Typically, TA is a determined distance from serving cell equipment based at least in part on delay measurements associated with TOA values. TA values can be reported while aerial UE are in communication with serving cell equipment.

The described embodiments, based on determining that UE are approaching defined or determinable areas controlled by serving cell equipment, core network equipment such as mobile edge compute (MEC) equipment, self organized network (SON) equipment, and/or radio access network (RAN) intelligent controller (RIC) equipment can initiate processes to facilitate and/or effectuate the following tasks: (1) monitor UAVs attached to terrestrial based special serving cell equipment; (2) determine whether or not the transmission gain (e.g., enb.tx.gain) values associated with the terrestrial based special serving cell equipment have been changed within a determinable or defined time period; (3) in response to determining that there has been a change in the enb.tx.gain values, directing the terrestrial based special serving cell equipment to immediately send a paging message with, for example, a flag, bit, or string of bits representative of system information modification (systemInfoModification) data, wherein the systemInfoModification data is indicative that there has been a change in the enb.tx.gain values (e.g., true). The systemInfoModification data can be transmitted to all UAVs attached to the terrestrial based special serving cell equipment whose enb.tx.gain values have changed; (4) each of the UAVs in response to receiving the systemInfoModification data can read new system information block (SIB) messages; (5) each of the UAVs can decode the new SIB messages; and (6) each of the UAVs can change their settings in accordance with the content (e.g., SIB message data) of each of the SIB messages.

Wireless mobile network operator entities (MNOs) can use terrestrial cellular network equipment, such as advanced network (e.g., long-term evolution (LTE) and/or fifth-generation (5G)) core mobile network operator (MNO) equipment (e.g., serving cell equipment, base station equipment, access point equipment, internet of things (IoT) equipment, picocell equipment, femtocell equipment, and/or other similar and pertinent equipment) to provide services to UAVs. As stated earlier, UAVs can have multiple use cases (e.g., delivery, monitoring, . . . ). MNOs can use terrestrial cellular equipment (e.g., LTE, 5G, . . . ), to provide services to UAVs. MNOs can add extra up-tilted serving cell equipment antennas to complement terrestrial coverage. These "special" serving cell equipment (e.g. terrestrial based special serving cell equipment servicing UAVs) can have high transmission power (tx.power) values compared to traditional terrestrial based serving cell equipment which generally service terrestrial based UE.

Serving cell equipment with up-tilted antennas specifically servicing UAVs can have relatively high tx.power values. For example, serving cell equipment (e.g., special serving cell equipment) with groups of up-tilted antennas specifically servicing UAVs can have tx.power values of about 100 Watts (100 W) compared to traditional terrestrial serving cell equipment which serve terrestrial based UEs which can have tx.power values in the range of about 40 W. These special serving cell equipment can have higher power amplifier gain, or multiple amplifiers in cascade mode. Higher tx.power values can translate into larger coverage areas.

Special terrestrial based serving cell equipment can have the ability to increase and/or reduce enb.tx.gain values. High enb.tx.gain values can be set when a UAV is located proximate to a cell edge (or peripheral extent) of the special serving cell equipment's broadcast range in order to further extend the special serving cell equipment's broadcast transmission range. Conversely, enb.tx.gain values can be reduced in situation where the UAV is situated within the central portion of the special serving cell equipment's broadcast range, since when the UAV is located in the central portion of the special serving cell equipment's broadcast range, the UAV generally does not need the enhanced broadcast transmission range. Further, when the UAV is situated at the central portion of the special serving cell equipment's broadcast range, the reduction in the enb.tx.gain values can save power at the special serving cell equipment.

Figure 8:
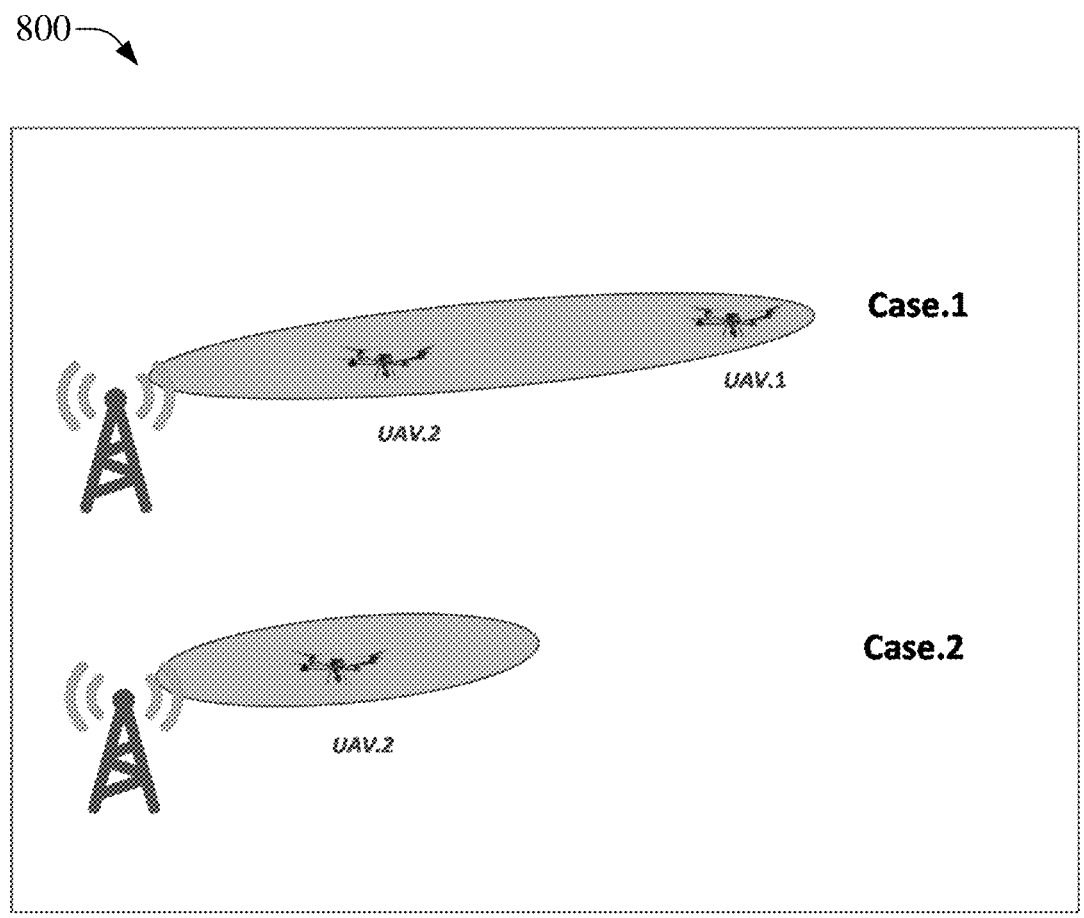
FIG. 8 depicts case scenarios applicable in the context of providing uplink power control adjustment for aerial UE or UAVs serviced by terrestrial based advanced network equipment, in accordance with aspects of the subject disclosure.

To illustrate the foregoing, as depicted in FIG. 8, two illustrative scenarios are depicted, Case.1 and Case.2. In Case.1 a first UAV (UAV.1) and a second UAV (UAV.2) can be attached to special serving cell equipment. UAV.1 can be situated at a peripheral edge of the special serving cell equipment's broadcast range, and as such the enb.tx.gain values can be boosted to a high value so that UAV.1 can be afforded coverage by the special serving cell equipment. Because UAV.2 is located toward a central portion of the special serving cell equipment, the high values of enb.tx.gain can also provide coverage to UAV.2. In Case.2 the first UAV (UAV.1) is no longer present within the broadcast umbra/penumbra cast by the special serving cell equipment (e.g., service for UAV.1 has been handed over to a neighboring special serving cell equipment), and as such the enb.tx.gain values can be reduced to low values causing the broadcast umbra/penumbra cast by the special serving cell equipment to shrink.

In general, when user equipment (UE) such as UAVs attach to LTE serving cell equipment, the serving cell equipment can receive a system information block (SIB) message (e.g., SIB1, SIB2, . . . ). SIB2 messages can contain data representative of reference signal power values that serving cell equipment is transmitting (e.g., reference.signal.power.transmitted values). Typically, UE only reads SIB2 messages during attachment to serving cell equipment. Example SIB messages are depicted in FIG. 9 and FIG. 11.

Typically, UE can also measure the received reference signal power values associated with the serving cell equipment (e.g., reference.signal.power.received values). The UE then determines, an estimated Path Loss (PL) value, as PL can be represented as:

PL=reference.signal.power.transmitted−reference.signal.power.rceived.

Large PL values can denote that the UE is at the limit (or edge) of the broadcast range afforded by serving cell equipment, while smaller PL values can indicate that the UE is more centrally located within the broadcast coverage area of the serving cell equipment.

UE can use the PL values to control uplink (UL) transmission power values. Thus, if UE determines that PL values are large, then UE can react by increasing UL.tx.power (uplink transmission power) values to ensure that UL signals are being received by serving cell equipment. Conversely, where PL values are smaller than UE can react by reducing its UL.tx.power values. In this manner, UE can save its battery life and can reduce interference to neighboring UE.

Returning to FIG. 8 and using the scenarios set forth in FIG. 8, in Case.2 subsequent to service for UAV.1 having been handed over to neighboring special serving cell equipment—when UAV.2 reads the SIB2 message and uses the reference.signal.power.transmitted values to estimate PL values while it is still traversing through, and within the broadcast coverage scope provided by the special serving cell equipment, the special serving cell equipment can determine that it should reduce its broadcast coverage area by decreasing its enb.tx.gain values. When the enb.tx.gain values are reduced the reference.signal.power.transmitted values can also be reduced. However, UAV.2, once attached to the special serving cell equipment, generally will not reread an updated SIB2 message, and therefore UAV.2 will use incorrect reference.signal.power.transmitted values to determine PL values. The PL values in Case.2 will be incorrect and larger than before (e.g., Case.1: when UAV.1 was flying at the peripheral bound of the broadcast coverage area). Because UAV.2 fails to reread the updated SIB2 message, it will unnecessarily increase its UL.tx.power values, wastefully drain its battery power, and cause interference to neighboring UAVs.

For purposes of illustration in the context of FIG. 8, in Case.1, when special serving cell equipment uses reference.signal.power.transmitted values of 18 decibel-milliwatts (dBm) (e.g., reference.signal.power.transmitted=18 dBm), UAV.2 in response to reading that reference.signal.power.received is −80 dBm can determine the PL value is 98 dBm (e.g., PL=18−(−80)=98 dBm).

With reference to Case.2, when special serving cell equipment reduces the enb.tx.gain values by, for example, 3 decibels (dB), UAV.2 reads the updated SIB2 message, but UAV.2 still keeps using reference.signal.power.transmitted=18 dBm. UAV.2 reads weaker reference.signal.power.received=−83 dBm. UAV.2 thus determines that the PL values as 101 dBm (e.g., PL=18−(−83)=101 dBm). UL.tx.power values are inaccurately increased by UAV.2 to compensate for the higher PL.

In regard to the terrestrial based special serving cell equipment disclosed herein, these special serving cell equipment are generally used only to provide additional coverage to UAV and typically do not provide coverage to terrestrial based UE. The disclosed terrestrial based special serving cell equipment generally can have a radio-module responsible to transmit and/or receive the LTE/5G waveform. The radio-module can also be responsible to set the waveform gain (e.g., enb.tx.gain) values. Generally, enb.tx.gain values can be set manually, and the enb.tx.gain values can be calibrated to achieve desirable enb.tx.power values. The final enb.tx.power values can be determined based on the following equation:

enb.tx.power=radio.enb.tx.power+enb.tx.gain+PA.gain.1+PA.gain.2, wherein two power amplifiers (PA) are used. enb.tx.gain values can be fine tuned to achieve desirable enb.tx.power values.

Further, these special serving cell equipment have capabilities to boost and/or reduce their broadcast coverage areas by adjusting enb.tx.gain values depending on UAV location. Moreover, these special serving cell equipment can detect the location of UAVs based at least in part on antennas associated with the special serving cell equipment.

In the context of the subject disclosure, network equipment and/or serving cell equipment can typically be base station equipment, eNodeB equipment, eNB equipment, gNodeB equipment, picocell equipment, macrocell equipment, microcell equipment, femtocell equipment, IoT equipment operating as mobile network operation (MNO) network equipment, access point equipment, or other such equipment. Further, the disclosed systems and/or methods can be operational at central node global control equipment (e.g., network equipment) located in the core network.

Examples of central node global control equipment can be mobile edge computing (MEC) equipment, self organized network (SON) equipment, and/or radio access network intelligent controller (RIC) equipment.

In some embodiments, UE information data and/or UE device type data is collected. It can be detected when, where, and whether an aerial UE is attached to, and/or is in operative communication with, the core network (or identifiable segments of the core network). Additionally, in accordance with further example embodiments, data can be collected that is representative of serving cell equipment capabilities, as well as network topologies of serving cell equipment (e.g., the network topologies of serving cell equipment currently providing service to aerial UE and/or terrestrial based UE situated within the broadcast range of current cell equipment and neighboring serving cell equipment that can be immediately proximate to, or positioned at distance from, current serving cell equipment). In accordance with various other example embodiments, data can also be collected that is representative of the geographical topographies and/or locations within which current serving cell equipment and its neighboring serving cell equipment are situated.

In accordance with some embodiments, based at least in part on data representative of UE information and UE device type, it can be determined whether or not a UE is an aerial UE. Information in regard to whether or not UE is an aerial type UE or terrestrial based UE can be conveyed and communicated to central node global control equipment as a flag comprising one or more bits. The central node global control equipment can then utilize and/or consult, for example, one or more database equipment comprising groups of relevant database tuples to correlate the received bits with an UE type (e.g., aerial UE or terrestrial based UE).

Now with reference to FIG. 1 that illustrates a system 100 (e.g., network equipment—central node global control equipment) that provides an uplink power control adjustment mechanism when terrestrial based special serving cell equipment with associated variable control are serving UAVs over LTE/5G networks. As illustrated system 100 can comprise adjustment engine 102 that can be communicatively coupled to processor 104, memory 106, and storage 108. Adjustment engine 102 can be in communication with processor 104 for facilitating operation of computer and/or machine executable instructions and/or components by adjustment engine 102, memory 106 for storing data and/or the computer or machine executable instructions and/or components, and storage 108 for providing longer term storage for data and/or machine and/or computer machining instructions. Additionally, system 100 can receive input 110 for use, manipulation, and/or transformation by adjustment engine 102 to produce one or more useful, concrete, and tangible result, and/or transform one or more articles to different states or things. Further, system 100 can also generate and output the useful, concrete, and tangible results, and/or the transformed one or more articles produced by adjustment engine 102, as output 112.

In some embodiments, system 100 can be Internet of Things (IoT) small form factor equipment capable of effective and/or operative communication with a network topology. Additionally in alternative embodiments, system 100 can be any type of mechanism, machine, device, apparatus, equipment, and/or instrument that can be utilized to dynamically configure inter-cell interference coordination between terrestrial based serving cell equipment that are serving aerial UE. Examples of types of mechanisms, equipment, machines, devices, apparatuses, and/instruments can include virtual reality (VR) devices, wearable devices, heads up display (HUD) devices, machine type communication devices, and/or wireless devices that communicate with radio network nodes in a cellular or mobile communication system. In various other embodiments, system 100 can comprise tablet computing devices, handheld devices, server class computing machines and/or databases, laptop computers, notebook computers, desktop computers, cell phones, smart phones, commercial and/or consumer appliances and/ or instrumentation, industrial devices and/or components, personal digital assistants, multimedia Internet enabled phones, Internet enabled devices, multimedia players, aeronautical/avionic devices associated with, for example, orbiting satellites and/or associated aeronautical vehicles, and the like.

Adjustment engine 102 can identify UE, e.g., UAV, based at least in part, for example, on IMSI values, or SIM values. Additionally and/or alternatively, adjustment engine 102 can identify approaching UAVs based on other subscriber or subscription data, such as unique UE serial number values, governmentally issued unique identification values, such as federal aviation administration tag values, UE manufacturer serial number values, UE model number values, unique visual identification values affixed to UE, unique identification values rendered perceivable using, for example, irradiated ultra-violet light, and/or unique identification values rendered observable, for instance, through illumination using infra-red light.

In other embodiments, identification of approaching UAVs can be facilitated by adjustment engine 102 through use of one-dimensional and/or multi-dimensional scanning technologies and barcode symbology, such as UPCs, matrix bar codes comprising machine-readable optical labels, and the like that can include information about the equipment to which it is attached.

In yet additional embodiments, identification of approaching UAV can be effectuated by adjustment engine 102 by using computer-vision based recognition technologies, wherein one or more unique surface contours (or identifiable surface point patterns) of the approaching UAV can be compared with repositories and databases of manufacturer defined contours or determinable surface point patterns associated with UAV.

Adjustment engine 102, having identified and/or detected approaching UAV can monitor and track the detected UAV to determine whether or not the approaching UAV is on a trajectory that causes it to enter the control ambit of special serving cell equipment. In order to determine whether or not the approaching UE may be on a trajectory that may cause it to enter cause it to enter the operational control ambit of special serving cell equipment, adjustment engine 102, in some embodiments can utilize, for instance, artificial intelligence technologies, neural networking architectures, collaborative filtering processes, machine learning techniques, and/or big data mining functionalities, wherein, for example, probabilistic determinations based at least in part on cost benefit analyses can be performed.

In additional and/or alternative other embodiments, the adjustment engine 102 can employ artificial intelligence technologies, neural networking architectures, collaborative filtering processes, machine learning techniques, Bayesian belief systems, big data mining and data analytic functionalities, and the like, wherein, for example, multi-objective optimization can be used to determine whether or not an action should be initiated and implemented. Multi-objective optimization can ensure that first actions or groups of first actions can only be implemented provided that other second actions or groups of other second actions are not detrimentally affected.

Adjustment engine 102, in order to track UAV entering and/or exiting the control and/or the monitoring ambit of equipment associated with network equipment 100, can also use one or more global navigation satellite system (GNSS) equipment (e.g., global positioning system (GPS) that can provide geolocation and/or time information to GNSS equipment anywhere on or near the earth where there is an unobstructed line of sight to the one or more GNSS equipment, such as one or more GNSS satellites in various earth orbits.

Additionally and/or alternatively, adjustment engine 102, in some embodiments, can use other triangulation processes to keep track of UE. For instance, in various embodiments, methods for determining ranges (e.g., variable distances) by targeting UE with light amplification by stimulated emission of radiation and measuring the time for the reflected light to return to one or more receiver can be used to track UE approaching and/or entering into a determined vicinity of a restricted area. In a similar manner, adjustment engine 102 can use the facilities and/or functionalities of detection systems that use radio waves to determine the range, angle, or velocity of objects and to determine whether or not UE are approaching and/or entering into the determined vicinity of the restricted area.

Other mechanisms used by adjustment engine 102 to track UE can also include determining UE position based on the measurement of the time of arrival (TOA) of one or more energy wave having known waveforms and/or speed when propagating either from and/or to multiple emitters and/or receivers of the waves such as one or more network equipment (e.g., serving cell equipment, base station equipment, IoT equipment, picocell equipment, femtocell equipment, and similarly functional equipment). In some instances, a UE's returned signal strength values to various antennae associated with the one or more network equipment (e.g., network equipment 100, serving cell equipment, base station equipment, IoT equipment, picocell equipment, femtocell equipment, and similarly functional equipment, . . . ) can be used to triangulate and provide positional references as to the trajectory of an individual UE.

Figure 10:
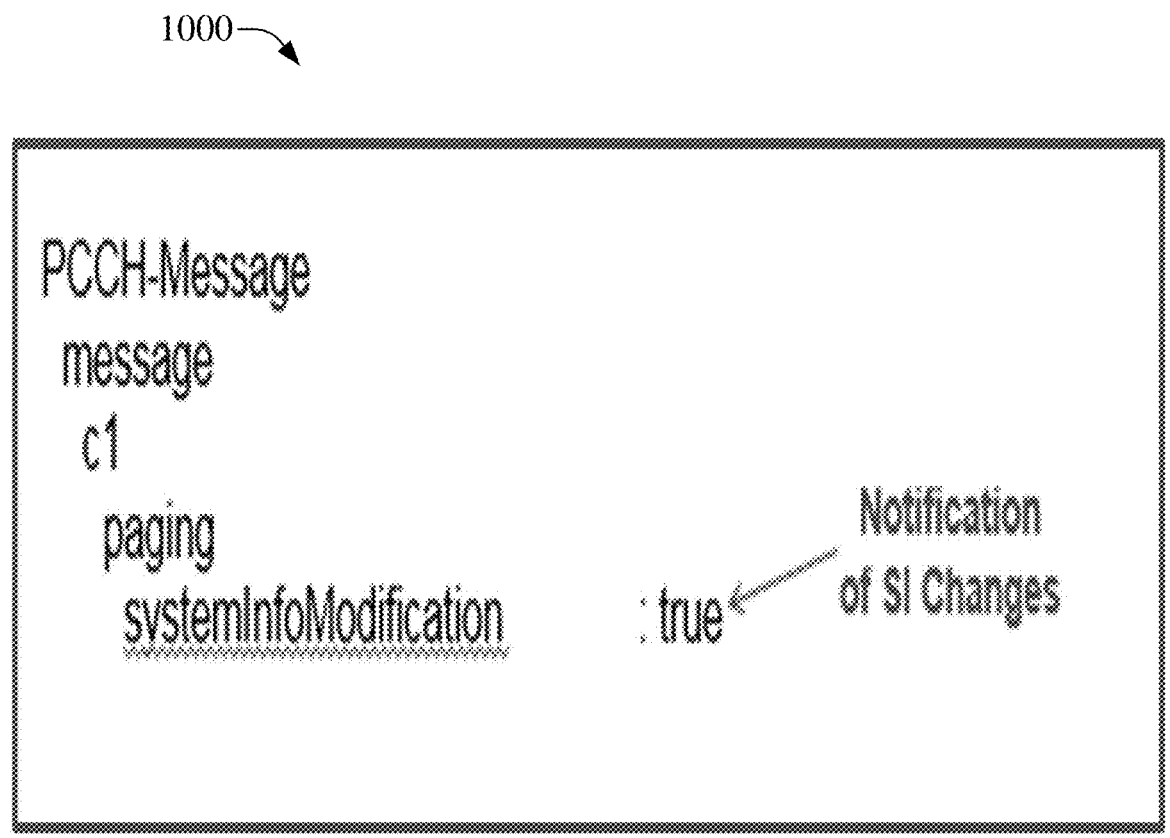
FIG. 10 provides depiction of a paging message employed in the context of providing uplink power control adjustment for aerial UE or UAVs serviced by terrestrial based advanced network equipment, in accordance with aspects of the subject disclosure.

Adjustment engine 102 based on determining that an UAV is enter the control ambit of special serving cell equipment can initiate processes to facilitate and/or effectuate the following tasks: (1) monitor UAVs attached to terrestrial based special serving cell equipment; (2) determine whether or not the transmission gain (e.g., enb.tx.gain) values associated with the terrestrial based special serving cell equipment has been changed within a determinable or defined time period; (3) in response to determining that there has been a change in the enb.tx.gain values, directing the terrestrial based special serving cell equipment to immediately send a paging message (an example paging message is illustrated in FIG. 10) with a flag, bit, or string of bits representative of system information modification (systemInfoModification) data, wherein the systemInfoModification data is indicative that there has been a change in the enb.tx.gain values (e.g., true). The systemInfoModification data can be transmitted to all UAVs attached to the terrestrial based special serving cell equipment whose enb.tx.gain values have changed; (4) each of the UAVs in response to receiving the systemInfoModification data can read the new system information block (SIB) messages; (5) each of the UAVs decode the new SIB messages; and (6) each of the UAVs change their settings accordingly.

In view of the example system(s) described above, example method(s) that can be implemented in accordance with the disclosed subject matter can be better appreciated with reference to the flowcharts and/or illustrative time sequence charts in FIGS. 2-7. For purposes of simplicity of explanation, an example method disclosed herein is presented and described as a series of acts; however, it is to be understood and appreciated that the disclosure is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, the disclosed example method can be implemented in combination with one or more other methods, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

Figure 2:
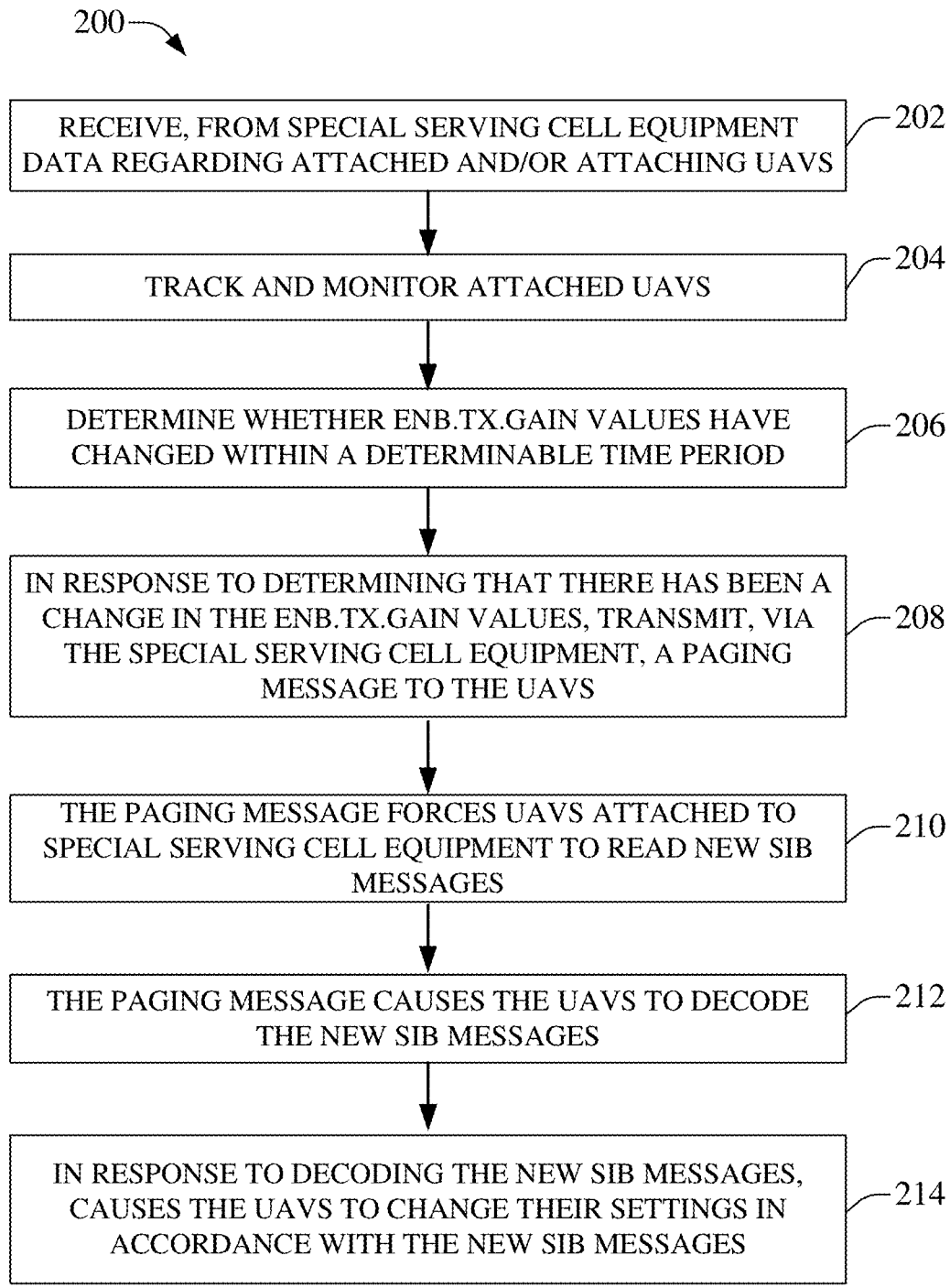
FIG. 2 provides illustration of a flow chart or method for uplink power control adjustment for aerial UE or UAVs serviced by terrestrial based advanced network equipment, in accordance with aspects of the subject disclosure.

FIG. 2 illustrates a flow chart of method 200 that can be operational and executed by system 100. Method 200, in execution by one or more processors, can provide an uplink power control adjustment mechanism when terrestrial based special serving cell equipment with associated variable control are serving UAVs over LTE/5G networks. Method 200 can begin at act 202 whereupon core equipment (e.g., adjustment engine 102) can receive from special serving cell equipment data concerning groups of attached and/or attaching UAVs. At act 204 the core equipment, based at least in part of the received data concerning the groups of attached and/or attaching UAVs can track and/or monitor each UAV comprising the groups of attached and/or attaching UAVs. At act 506, core equipment can periodically (e.g., at defined or definable time periods) and/or constantly receive reports from special serving cell equipment regarding changes enb.tx.gain values. In some embodiments, at act 206, special serving cell equipment can transmit a report to core equipment in response to special serving cell equipment having initiated a change in its enb.tx.gain values. At act 208 core equipment, in response to determining that there has been a change in the enb.tx.gain values associated with special serving cell equipment can transmit, via the special serving cell equipment, a paging message to the groups of attached and/or attaching UAVs. An illustrative paging message is provided in reference to FIG. 10. At act 210 the paging message dispatched to groups of attached and/or attaching UAVs can cause each of the UAVs to read new or updated SIB messages (e.g., SIB1 messages, SIB2 messages, . . . ). Additionally, at act 212 the paging message sent to the groups of attached and/or attaching UAVs can cause each of the UAVs to initiate processes to decode the new or updated SIB messages. Further, at act 214, in response to decoding the new or updated SIB message, each of the UAVs comprising the groups of attached and/or attaching UAVs can initiate processes that cause each of the UAVs to change or adjust their operational settings in accordance with the contents set forth in the new or updated SIB messages.

Figure 3:
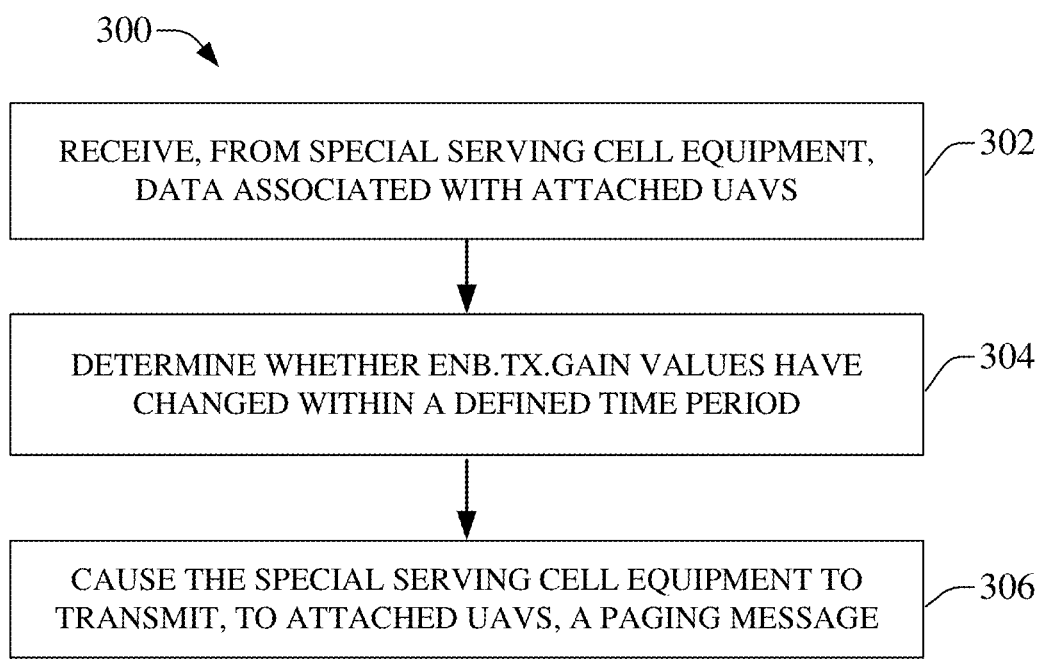
FIG. 3 provides illustration of a flow chart or method for uplink power control adjustment for aerial UE or UAVs serviced by terrestrial based advanced network equipment, in accordance with aspects of the subject disclosure.

FIG. 3 illustrates a flow chart or method 300 that can be used to provide an uplink power control adjustment mechanism when terrestrial based special serving cell equipment with associated variable control are serving UAVs over LTE/5G networks. Method 300 can be used by central node global control equipment located on the core network. Examples of central node global control equipment can comprise MEC equipment, SON equipment, and/or RIC equipment.

Method 300 can commence at act 302 wherein central node global equipment (e.g., adjustment engine 102) can receive from special serving cell equipment data associated with UAVs that can attached to the special serving cell equipment. The data associated with the UAVs can include identifying information about each of the attached and/or attaching UAVs. Additional data the can be forwarded from special serving cell equipment to central node global equipment can comprise information regarding whether or not the forwarding special serving cell equipment has adjusted its enb.tx.gain values within a determinable period of time. Typically, when a special serving cell equipment adjusts its enb.tx.gain values it should immediately report to central node global equipment that there has been a change in enb.tx.gain values. At act 304 central node global equipment, having been informed by a reporting special serving cell equipment, and in response to, there has been an adjustment of its enb.tx.gain values, can verify that a change in enb.tx.gain values has occurred. Verification, by central node global equipment, that changes have occurred with regard to enb.tx.gain values can facilitated through use of database equipment comprising groups of relevant database tuples. At act 306 central node global equipment having ascertained that there has been a change in enb.tx.gain values associated with the special serving cell equipment that reported that it had adjusted its enb.tx.gain values, central node global equipment can ensure that the special serving cell equipment transmits to each UAV that is attached and/or is attaching to it, a paging message comprising data related to at least "systemInfoModification: true". An example of an illustrative paging message in depicted in FIG. 10.

Figure 4:
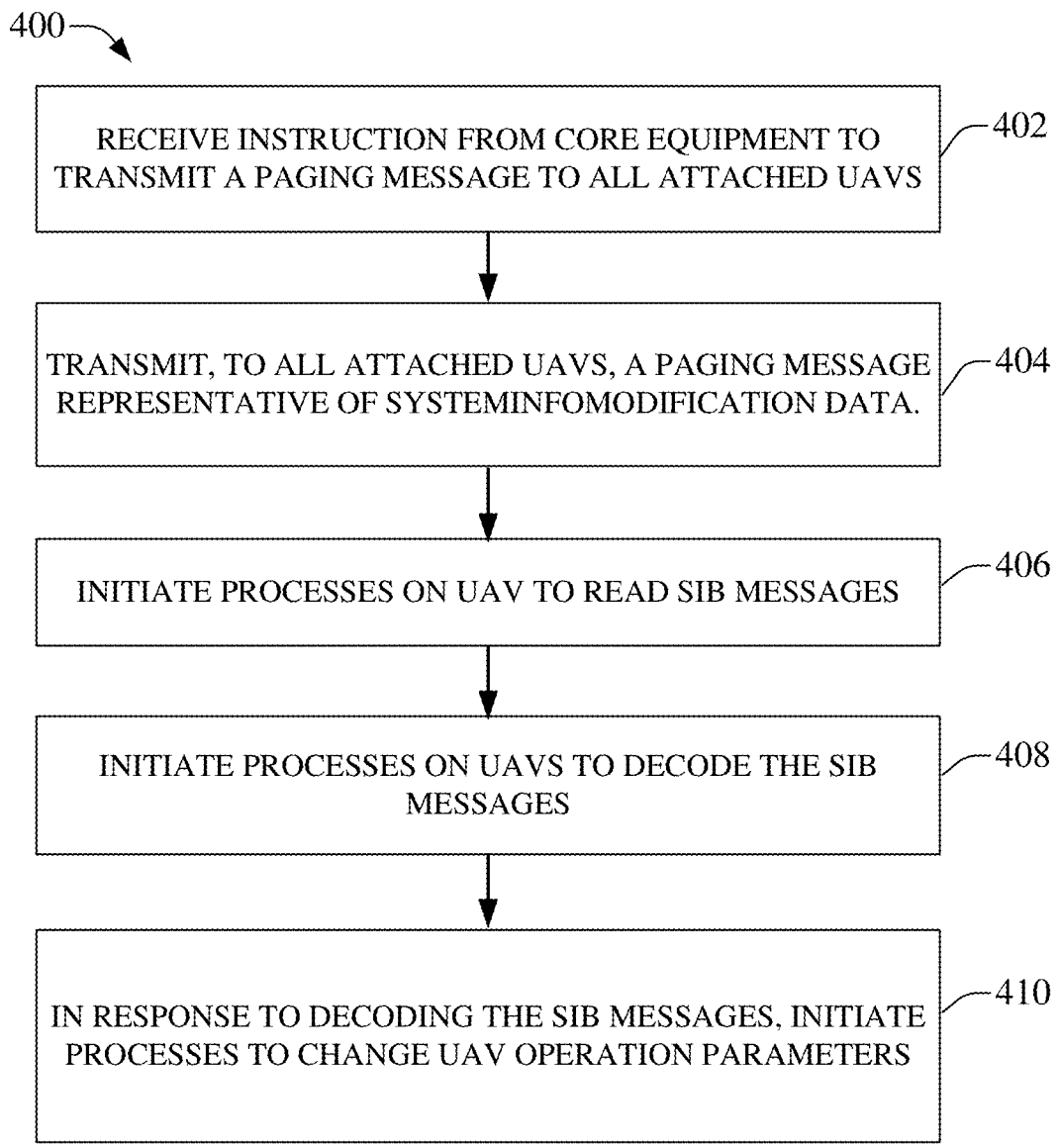
FIG. 4 provides illustration of a flow chart or method for uplink power control adjustment for aerial UE or UAVs serviced by terrestrial based advanced network equipment, in accordance with aspects of the subject disclosure.

FIG. 4 illustrates a flow chart or method 400 that can be used to provide an uplink power control adjustment mechanism when terrestrial based special serving cell equipment with associated variable control are servicing UAVs over LTE/5G networks. Method 400 can be effectuated, for example, by special serving cell equipment. Method 400 can commence at act 402 where special serving cell equipment, to which groups of UAVs are attached, can receive instructions from core equipment that the special serving cell equipment should transmit a paging message to all the attached UAVs. At act 404 the special serving cell equipment can transmit, to all the attached UAVs, a paging message. The paging message can comprise systemInfoModification data (e.g., "systemInfoModification: true") that UAVs can use to initiate: at act 406, reading of SIB messages; at act 408 decoding SIB messages; and act 410 in response to decoding the SIB messages, changing their operational parameters (e.g., the operational parameters being used by UAVs).

Figure 5:
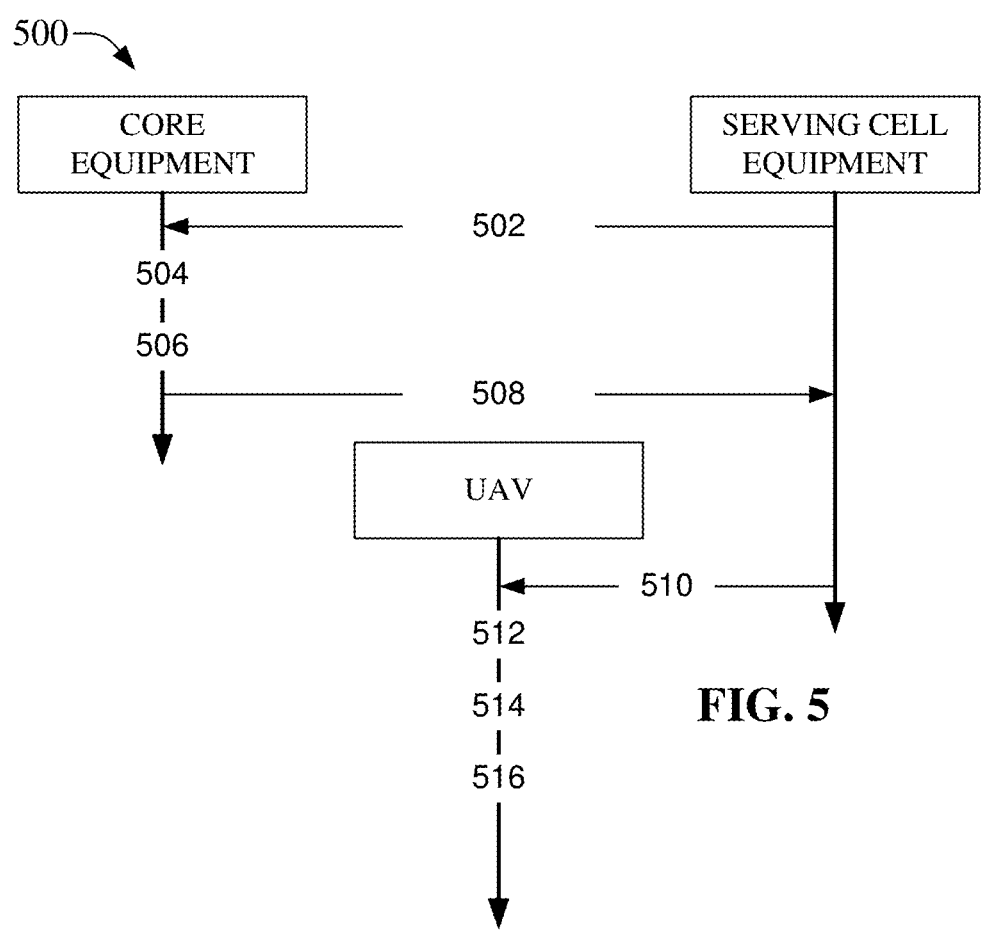
FIG. 5 provides illustration of a time sequence chart or method for uplink power control adjustment for aerial UE or UAVs serviced by terrestrial based advanced network equipment, in accordance with aspects of the subject disclosure.

FIG. 5 illustrates a time sequence chart or methodology 500 that can be used to practice the disclosed subject matter. Time sequence chart 500 can commence at act 502 whereupon core equipment can receive from special serving cell equipment data concerning groups of attached and/or attaching UAVs. At act 504 the core equipment, based at least in part of the received data concerning the groups of attached and/or attaching UAVs can track and/or monitor each UAV comprising the groups of attached and/or attaching UAVs. At act 506, core equipment can periodically (e.g., at defined or definable time periods) and/or constantly receive reports from special serving cell equipment regarding changes enb.tx.gain values. In some embodiments, at act 506, special serving cell equipment can transmit a report to core equipment in response to special serving cell equipment having initiated a change in its enb.tx.gain values. At act 506 core equipment, in response to determining that there has been a change in the enb.tx.gain values associated with special serving cell equipment can transmit, at 508 a paging message to the special serving cell equipment. At act 510 special serving cell equipment can transmit to groups of attached and/or attaching UAVs the paging message that it can have received from core equipment at act 508. At act 510 the paging message dispatched to groups of attached and/or attaching UAVs can cause a cascading sequence of events wherein at act 512 each of the UAVs reads new or updated SIB messages; at act 514 each of the UAVs initiates processes to decode the new or updated SIB messages; and at act 516 each of the UAVs comprising the groups of attached and/or attaching UAVs can initiate processes that cause each of the UAVs to change or adjust their operational settings in accordance with the contents set forth in the new or updated SIB messages.

Figure 6:
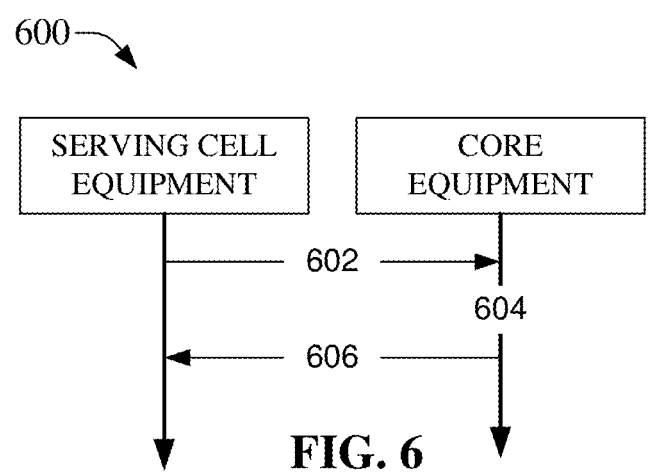
FIG. 6 provides depiction of another time sequence chart or method for uplink power control adjustment for aerial UE or UAVs serviced by terrestrial based advanced network equipment, in accordance with aspects of the subject disclosure.

FIG. 6 illustrates a time sequence chart or methodology 600 that can be used to practice the disclosed subject matter. Time sequence chart or methodology 600 depicts interaction between central node global equipment (core equipment) and special serving cell equipment. Time sequence chart or methodology 600 can begin at act 602 wherein central node global equipment can receive from special serving cell equipment data associated with UAVs that can be attached to the special serving cell equipment. The data associated with the UAVs can include identifying information about each of the attached and/or attaching UAVs. Additional data the can be forwarded from special serving cell equipment to central node global equipment can comprise information regarding whether or not the forwarding special serving cell equipment has adjusted its enb.tx.gain values within a defined or determinable period of time. Typically, when a special serving cell equipment adjusts its enb.tx.gain values it immediately reports to central node global equipment that there has been a change in enb.tx.gain values. At act 604 central node global equipment, having been informed by a reporting special serving cell equipment, and in response to, there having been an adjustment of enb.tx.gain values, can verify that a change in enb.tx.gain values has occurred. At act 606 central node global equipment having ascertained that there has been a change in enb.tx.gain values associated with the special serving cell equipment that reported that it had adjusted its enb.tx.gain values, can ensure that the special serving cell equipment transmits to each UAV that is attached and/or is attaching to it, a paging message comprising data related to at least "systemInfoModification: true".

Figure 7:
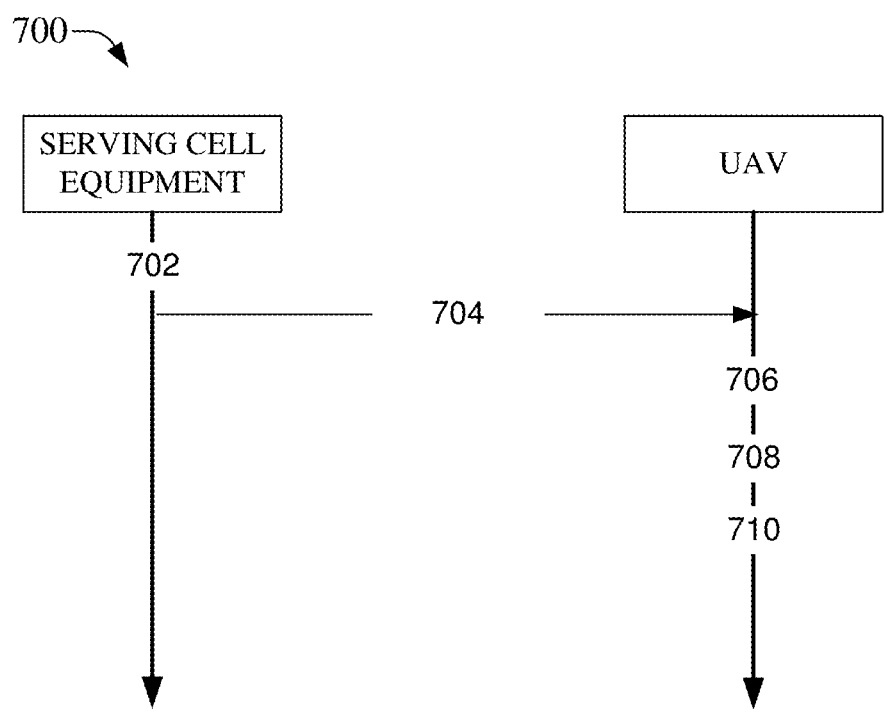
FIG. 7 provides illustration of a further time sequence chart of method for uplink power control adjustment for aerial UE or UAVs serviced by terrestrial based advanced network equipment, in accordance with aspects of the subject disclosure.

FIG. 7 illustrates a time sequence chart or methodology 700 that can be used to practice the disclosed subject matter. Time sequence chart or methodology 700 depicts interaction between special serving cell equipment and UAVs that can be attaching and/or are attached to the special serving cell equipment. Time sequence chart or methodology 700 can start at act 702 wherein special serving cell equipment, to which groups of UAVs are attached, having received instructions from core equipment that the special serving cell equipment should transmit a paging message to all the attached UAVs, can at act 704 transmit, to all the attached UAVs, a paging message. As noted earlier, the paging message can comprise systemInfoModification data (e.g., "systemInfoModification: true") that the UAVs can use to initiate: at act 706, reading of SIB messages; at act 708 decoding SIB messages; and act 710 in response to decoding the SIB messages, changing their operational parameters (e.g., the operational parameters being used by UAVs).

In regard to the foregoing disclosure, it should be noted that central node global control equipment can collect key performance indicator (KPI) values returned to, or received by, serving cell equipment (or central node global control equipment) by UE (terrestrial based and/or aerial) located within the coverage ambit of serving cell equipment. Examples of KPI values that can be returned by UE to serving cell equipment can include: values associated with RSRP measurement values, received signal strength indicator (RSSI) measurement values, quality of service (QoS) metric values, signal to noise ratio (SNR) values, received signal code power (RSCP) values, signal to interference ratio (SIR) values, signal to interference plus noise ratio (SINR) values, distance measurement values (e.g., determined based on global positioning satellite (GPS) data, geo-location data, geo-tag data, or other such relevant positioning data) indicating distances between UE and serving cell equipment, distance measurement values indicating distances between UE and respective neighboring serving cell equipment, or other similarly appropriate values. As has been noted, KPI values can be values that can have been periodically returned within measurement reports by UE extant within the control and/or coverage ambit associated with network equipment, such as serving cell equipment, neighboring serving cell equipment, or similar network equipment.

Many use cases of unmanned aerial vehicles (UAVs), such as drones, require beyond visual line of sight (LOS) communications. Mobile networks can offer wide area, high speed, and secure wireless connectivity, which can enhance control and safety of UAV operations and enable beyond visual LOS use cases. Existing long term evolution (LTE) networks can support initial drone deployments. LTE evolution and 5G can provide more efficient connectivity for wide-scale drone deployments. New and exciting applications for drones are being envisioned and are emerging. These envisioned and prospective applications can be a potential boon for mobile network operator entities. Use cases of commercial UAVs are growing rapidly, including delivery, communications and media, inspection of critical infrastructure, surveillance, search-and-rescue operations, agriculture, and similar worthy endeavors.

Research and development of current mobile broadband communication (e.g., LTE) has been primarily devoted to terrestrial based communication. Providing tether-less broadband connectivity for UAVs is an emerging field.

Figure 12:
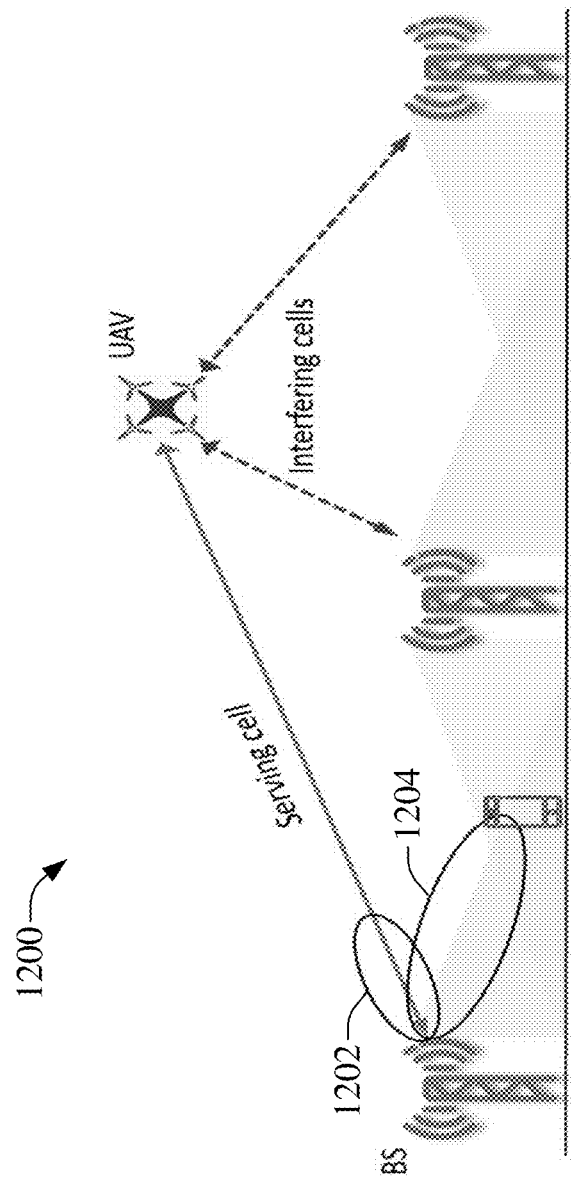
FIG. 12 provides illustration of how network equipment antenna direction affects aerial user equipment, in accordance with aspects of the subject disclosure.

One main aspect that makes using LTE to serve UAVs challenging is the fact that mobile LTE networks are generally optimized for terrestrial broadband communication. Thus, the antennas associated with terrestrial based serving equipment (such as base station equipment, eNodeB equipment, eNB equipment, gNodeB equipment, picocell equipment, macrocell equipment, microcell equipment, femtocell equipment, IoT equipment operating as mobile network operation (MNO) network equipment, access point equipment, and the like) are typically down-tilted to reduce the interference power levels to other serving cell equipment. With down tilted antennas, small UAVs may thus only be served by transmission or broadcast side lobes of the antennas associated with terrestrial based serving cell equipment. FIG. 12 illustrates the broadcast disparity between the down-tilted antennas 1202 and side lobes 1204.

Due to the presence of possible voids or nulls in the transmission side lobes 1204, and due to close-to-free-space propagation in the sky, aerial UAVs or aerial UEs can detect several ground-based serving cell equipment within a defined geographical area. In addition, aerial UE, since they typically are positioned above terrestrial based radio equipment and above radio signal echo (e.g., radio clutter) emanating from serving cell equipment, can detect stronger signals from distant serving cell equipment (e.g., interfering cells) than terrestrial based UE that are more geographically proximate. Thus, aerial UE can be served by much more distant serving cell equipment (e.g., interfering cells) instead of the most proximate serving cell equipment.

Figure 13:
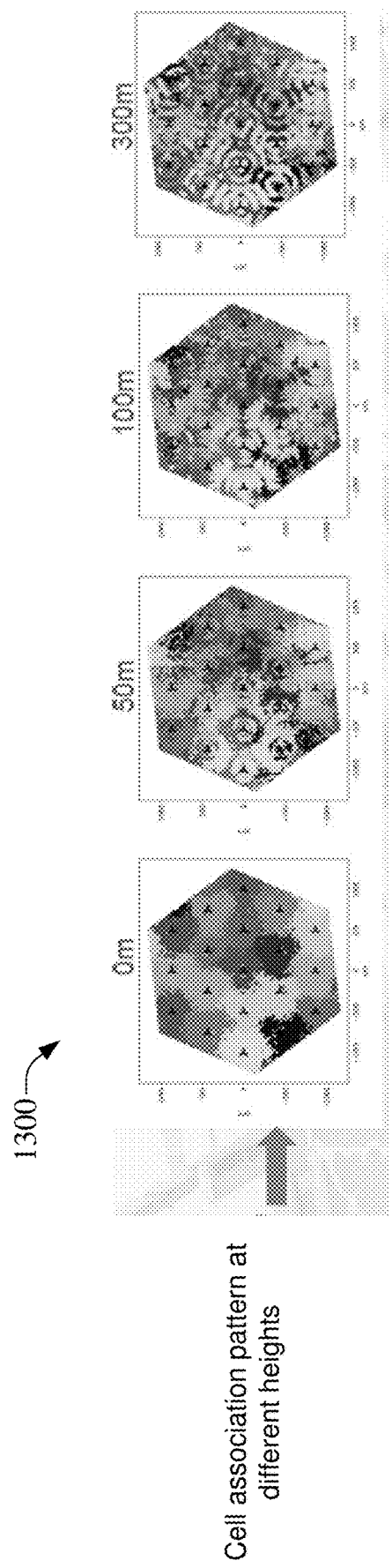
FIG. 13 provides depiction of network equipment association patterns at different altitudes, in accordance with aspects of the subject disclosure.

FIG. 13 provides depiction of the relative disparities in coverage areas between terrestrial coverage areas and aerial coverage areas. In FIG. 13 it will be observed, that at lesser heights, for example, at 0 meters (m) the broadcast coverage area pattern of network cell equipment is generally distinct and clear; the coverage areas being defined clusters around one or more central point associated with respective network cell equipment. However, at greater heights (e.g., 50 m, 100 m, 300 m) above terrain the coverage areas associated with respective network equipment become less and less well defined and more and more amorphous.

Figure 14:
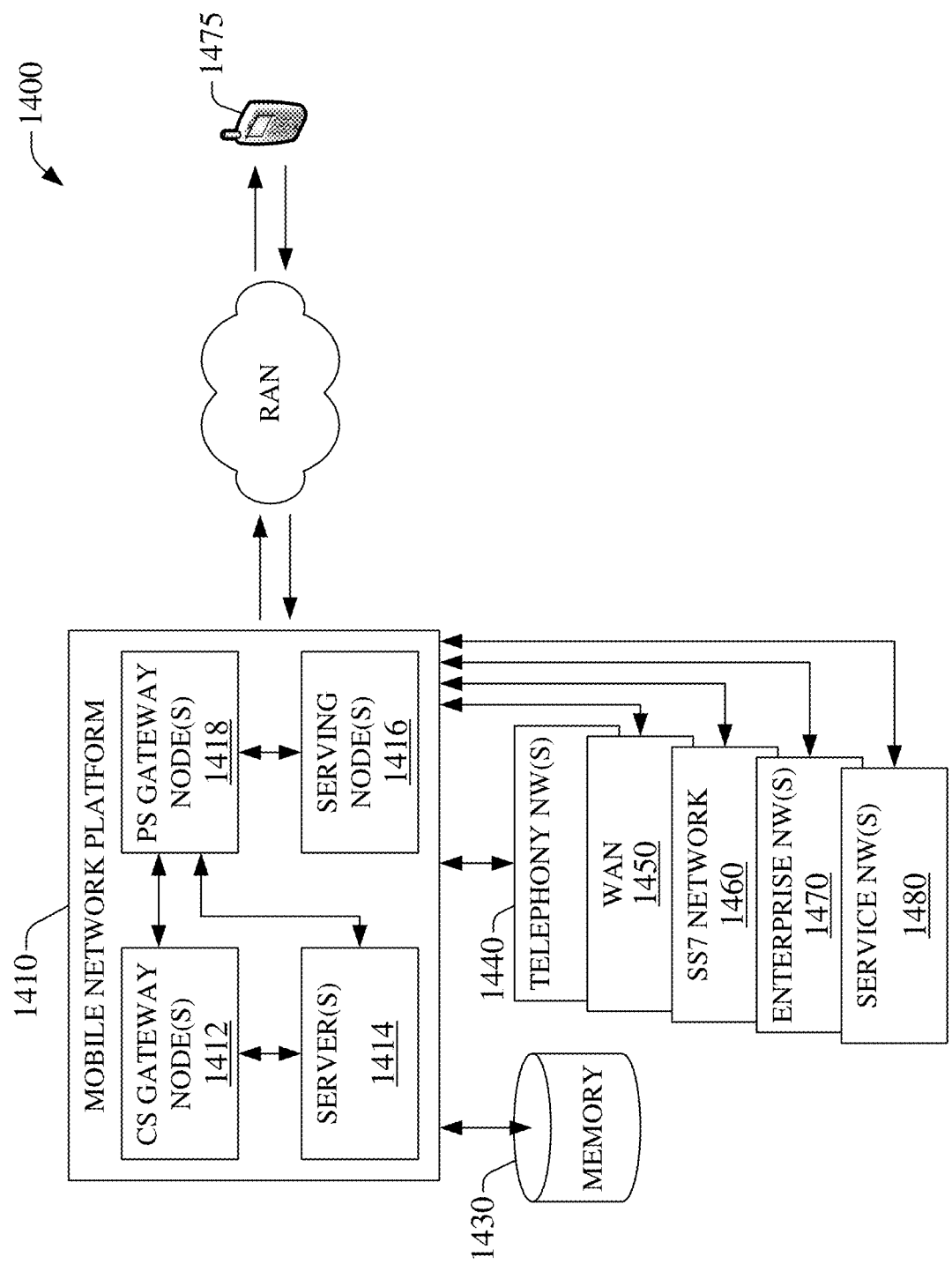
FIG. 14 is a block diagram of an example embodiment of a mobile network platform to implement and exploit various features or aspects of the subject disclosure.

FIG. 14 presents an example embodiment 1400 of a mobile network platform 1410 that can implement and exploit one or more aspects of the disclosed subject matter described herein. Generally, wireless network platform 1410 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 1410 can be included in telecommunications carrier networks, and can be considered carrier-side components as discussed elsewhere herein. Mobile network platform 1410 includes CS gateway node(s) 1412 which can interface CS traffic received from legacy networks like telephony network(s) 1440 (e.g., public switched telephone network (PSTN), or public land mobile network (PLMN)) or a signaling system #7 (SS7) network 1470. Circuit switched gateway node(s) 1412 can authorize and authenticate traffic (e.g., voice) arising from such networks. Additionally, CS gateway node(s) 1412 can access mobility, or roaming, data generated through SS7 network 1460; for instance, mobility data stored in a visited location register (VLR), which can reside in memory 1430. Moreover, CS gateway node(s) 1412 interfaces CS-based traffic and signaling and PS gateway node(s) 1418. As an example, in a 3GPP UMTS network, CS gateway node(s) 1412 can be realized at least in part in gateway GPRS support node(s) (GGSN). It should be appreciated that functionality and specific operation of CS gateway node(s) 1412, PS gateway node(s) 1418, and serving node(s) 1416, is provided and dictated by radio technology(ies) utilized by mobile network platform 1410 for telecommunication.

In addition to receiving and processing CS-switched traffic and signaling, PS gateway node(s) 1418 can authorize and authenticate PS-based data sessions with served mobile devices. Data sessions can include traffic, or content(s), exchanged with networks external to the wireless network platform 1410, like wide area network(s) (WANs) 1450, enterprise network(s) 1470, and service network(s) 1480, which can be embodied in local area network(s) (LANs), can also be interfaced with mobile network platform 1410 through PS gateway node(s) 1418. It is to be noted that WANs 1450 and enterprise network(s) 1470 can embody, at least in part, a service network(s) like IP multimedia subsystem (IMS). Based on radio technology layer(s) available in technology resource(s) 1417, packet-switched gateway node(s) 1418 can generate packet data protocol contexts when a data session is established; other data structures that facilitate routing of packetized data also can be generated. To that end, in an aspect, PS gateway node(s) 1418 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 1400, wireless network platform 1410 also includes serving node(s) 1416 that, based upon available radio technology layer(s) within technology resource(s) 1417, convey the various packetized flows of data streams received through PS gateway node(s) 1418. It is to be noted that for technology resource(s) 1417 that rely primarily on CS communication, server node(s) can deliver traffic without reliance on PS gateway node(s) 1418; for example, server node(s) can embody at least in part a mobile switching center. As an example, in a 3GPP UMTS network, serving node(s) 1416 can be embodied in serving GPRS support node(s) (SGSN).

For radio technologies that exploit packetized communication, server(s) 1414 in wireless network platform 1410 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 1410. Data streams (e.g., content(s) that are part of a voice call or data session) can be conveyed to PS gateway node(s) 1418 for authorization/authentication and initiation of a data session, and to serving node(s) 1416 for communication thereafter. In addition to application server, server(s) 1414 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 1410 to ensure network's operation and data integrity in addition to authorization and authentication procedures that CS gateway node(s) 1412 and PS gateway node(s) 1418 can enact. Moreover, provisioning server(s) can provision services from external network(s) like networks operated by a disparate service provider; for instance, WAN 1450 or Global Positioning System (GPS) network(s) (not shown). Provisioning server(s) can also provision coverage through networks associated to wireless network platform 1410 (e.g., deployed and operated by the same service provider), such as femto-cell network(s) (not shown) that enhance wireless service coverage within indoor confined spaces and offload radio access network resources in order to enhance subscriber service experience within a home or business environment by way of UE 1475.

It is to be noted that server(s) 1414 can include one or more processors configured to confer at least in part the functionality of macro network platform 1410. To that end, the one or more processors can execute code instructions stored in memory 1430, for example. It should be appreciated that server(s) 1414 can include a content manager 1415, which operates in substantially the same manner as described hereinbefore.

In example embodiment 1400, memory 1430 can store information related to operation of wireless network platform 1410. Other operational information can include provisioning information of mobile devices served through wireless platform network 1410, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1430 can also store information from at least one of telephony network(s) 1440, WAN 1450, enterprise network(s) 1470, or SS7 network 1460. In an aspect, memory 1430 can be, for example, accessed as part of a data store component or as a remotely connected memory store.

Figure 15:
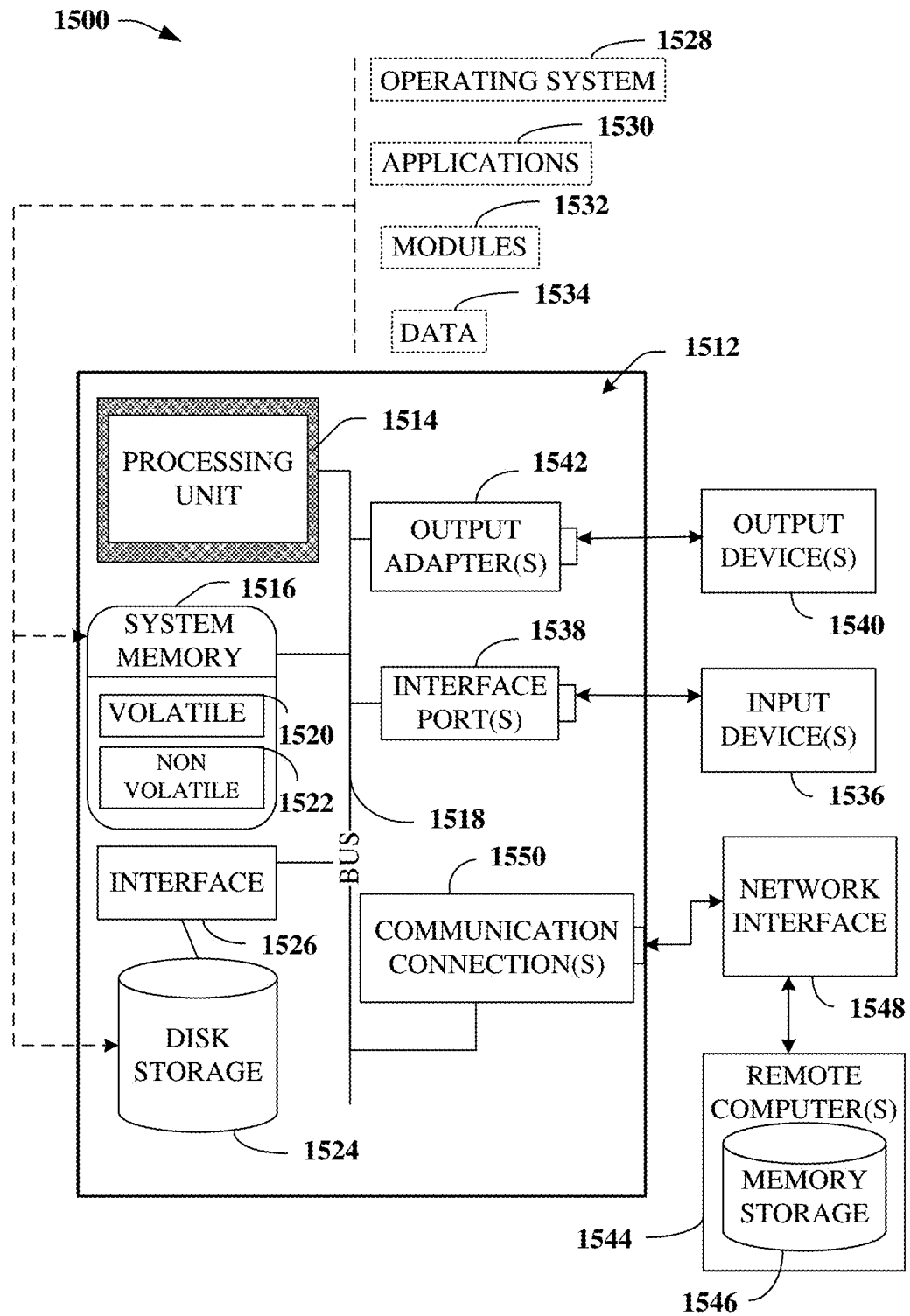
FIG. 15 illustrates a block diagram of a computing system operable to execute the disclosed example embodiments.

In order to provide a context for the various aspects of the disclosed subject matter, FIG. 15, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1520 (see below), non-volatile memory 1522 (see below), disk storage 1524 (see below), and memory storage 1546 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 15 illustrates a block diagram of a computing system 1500 operable to execute one or more parts of one or more of the disclosed example embodiments. Computer 1512, which can be, for example, part of the hardware of system 100, includes a processing unit 1514, a system memory 1516, and a system bus 1518. System bus 1518 couples system components including, but not limited to, system memory 1516 to processing unit 1514. Processing unit 1514 can be any of various available processors. Dual microprocessors and other multiprocessor architectures also can be employed as processing unit 1514.

System bus 1518 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect, Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

System memory 1516 can include volatile memory 1520 and nonvolatile memory 1522. A basic input/output system (BIOS), containing routines to transfer information between elements within computer 1512, such as during start-up, can be stored in nonvolatile memory 1522. By way of illustration, and not limitation, nonvolatile memory 1522 can include ROM, PROM, EPROM, EEPROM, or flash memory. Volatile memory 1520 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1512 can also include removable/non-removable, volatile/non-volatile computer storage media. FIG. 15 illustrates, for example, disk storage 1524. Disk storage 1524 includes, but is not limited to, devices like a magnetic disk drive, floppy disk drive, tape drive, flash memory card, or memory stick. In addition, disk storage 1524 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1524 to system bus 1518, a removable or non-removable interface is typically used, such as interface 1526.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 15 describes software that acts as an intermediary between users and computer resources described in suitable operating environment 1500. Such software includes an operating system 1528. Operating system 1528, which can be stored on disk storage 1524, acts to control and allocate resources of computer system 1512. System applications 1530 take advantage of the management of resources by operating system 1528 through program modules 1532 and program data 1534 stored either in system memory 1516 or on disk storage 1524. It is to be noted that the disclosed subject matter can be implemented with various operating systems or combinations of operating systems.

A user can enter commands or information into computer 1512 through input device(s) 1536. As an example, mobile device and/or portable device can include a user interface embodied in a touch sensitive display panel allowing a user to interact with computer 1512. Input devices 1536 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1514 through system bus 1518 by way of interface port(s) 1538. Interface port(s) 1538 include, for example, a serial port, a parallel port, a game port, a universal serial bus (USB), an infrared port, a Bluetooth port, an IP port, or a logical port associated with a wireless service, etc. Output device(s) 1540 use some of the same type of ports as input device(s) 1536.

Thus, for example, a USB port can be used to provide input to computer 1512 and to output information from computer 1512 to an output device 1540. Output adapter 1542 is provided to illustrate that there are some output devices 1540 like monitors, speakers, and printers, among other output devices 1540, which use special adapters. Output adapters 1542 include, by way of illustration and not limitation, video and sound cards that provide means of connection between output device 1540 and system bus 1518. It should be noted that other devices and/or systems of devices provide both input and output capabilities such as remote computer(s) 1544.

Computer 1512 can operate in a networked environment using logical connections to one or more remote computers, such as remote computer(s) 1544. Remote computer(s) 1544 can be a personal computer, a server, a router, a network PC, cloud storage, cloud service, a workstation, a microprocessor based appliance, a peer device, or other common network node and the like, and typically includes many or all of the elements described relative to computer 1512.

For purposes of brevity, only a memory storage device 1546 is illustrated with remote computer(s) 1544. Remote computer(s) 1544 is logically connected to computer 1512 through a network interface 1548 and then physically connected by way of communication connection 1550. Network interface 1548 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1550 refer(s) to hardware/software employed to connect network interface 1548 to bus 1518. While communication connection 1550 is shown for illustrative clarity inside computer 1512, it can also be external to computer 1512. The hardware/software for connection to network interface 1548 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating there from. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) LTE; 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of embodiments illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system comprising:
a processor; and
a memory that stores instructions that, when executed by the processor, facilitates performance of operations, comprising:
receiving report data from serving cell equipment, wherein the report data comprises a change in a transmission gain value associated with the serving cell equipment;
based on the change in the transmission gain value, transmitting, via the serving cell equipment, paging message data to a group of unmanned aerial vehicles; and
based on the paging message data, instructing the group of unmanned aerial vehicles to update an uplink power control mechanism used by the group of unmanned aerial vehicles to communicate with the serving cell equipment.

2. The system of claim 1, wherein the group of unmanned aerial vehicles is being serviced by the serving cell equipment.

3. The system of claim 1, wherein the serving cell equipment is special serving cell equipment, and wherein the special serving cell equipment is associated with a collection of up tilted antennas.

4. The system of claim 1, wherein the serving cell equipment is special serving cell equipment, and wherein the special serving cell equipment is dedicated to service the unmanned aerial equipment.

5. The system of claim 1, wherein the serving cell equipment is special serving cell equipment, and wherein the special serving cell equipment is capable of transmitting, using an up tilted antenna, at transmission power values greater than standard serving cell equipment that serve terrestrial user equipment.

6. The system of claim 1, wherein the serving cell equipment is special serving cell equipment, and wherein the special serving cell equipment is capable of adjusting the transmission gain value from a first transmission gain value to a second transmission gain value.

7. The system of claim 1, wherein the serving cell equipment is special serving cell equipment, and wherein the special serving cell equipment comprises a group of amplifiers implemented in a cascade mode.

8. The system of claim 1, wherein the serving cell equipment is special serving cell equipment, and wherein, in response to the transmission gain value being set to a maximum value, a broadcast umbra cast by the special serving cell equipment to service the unmanned aerial vehicle is increased to cover a greater geographic coverage area.

9. The system of claim 1, wherein the serving cell equipment is special serving cell equipment, and wherein, in response to the transmission gain value being set to a minimum value, a broadcast penumbra cast by the special serving cell equipment to service the unmanned aerial vehicle is decreased to cover a smaller geographic coverage area.

10. The system of claim 1, wherein the operations further comprise determining that the unmanned aerial vehicle is located at a peripheral edge of the broadcast coverage area cast by the serving cell equipment, and increasing, by the serving cell equipment, the transmission gain value to a maximum transmission gain value.

11. The system of claim 1, wherein the operations further comprise determining that the unmanned aerial vehicle is situated at a central portion of the broadcast coverage area cast by the serving cell equipment, and decreasing, by the serving cell equipment, the transmission gain value to a minimum transmission gain value.

12. The system of claim 1, wherein the group of unmanned aerial vehicles each utilize an autonomous uplink power mechanism to communicate with the serving cell equipment, wherein the autonomous uplink power mechanism estimates a path loss between each unmanned aerial vehicle of the group of unmanned aerial vehicles and the serving cell equipment based on a broadcast signaling message received from the serving cell equipment.

13. The system of claim 1, wherein the uplink power control mechanism utilized by each unmanned aerial vehicle of the group of the unmanned aerial vehicles allows for a transmission of a waveform from each unmanned aerial vehicle to the serving cell equipment.

14. The system of claim 1, wherein transmission of the paging message data by the serving cell equipment to each unmanned aerial vehicle of the group of unmanned aerial vehicles requires each unmanned aerial vehicle to read newly broadcast signaling messages transmitted from the serving cell equipment and requires each unmanned aerial vehicle to update the uplink power control mechanism associated with each unmanned aerial vehicle.

15. A method, comprising:
receiving, by a device comprising a processor, report data from serving cell equipment, wherein the report data comprises a change in a transmission gain value associated with the serving cell equipment;
based on the change in the transmission gain value, transmitting, by the device, via the serving cell equipment, paging message data to a group of unmanned aerial vehicles; and
based on the paging message data, instructing, by the device, the group of unmanned aerial vehicles to read newly broadcast signaling messages from serving cell equipment and update an uplink power control mechanism associated with an unmanned aerial vehicle of the group of unmanned aerial vehicles.

16. The method of claim 15, wherein the serving cell equipment services the group of unmanned aerial vehicles.

17. The method of claim 15, wherein the serving cell equipment is capable of adjusting the transmission gain value from a first transmission gain value to a second transmission gain value.

18. A non-transitory machine-readable medium, comprising executable instructions that, when executed by a processor, facilitate performance of operations, comprising:
receiving report data from serving cell equipment, wherein the report data comprises an adjustment in a transmission gain value initiated by the serving cell equipment;
based on the adjustment in the transmission gain value, sending, via the serving cell equipment, paging message data to a group of aerial user equipment; and
based on the paging message data, instructing the group of aerial user equipment to each update an uplink power control mechanism used by each aerial equipment of the group of aerial user equipment to communicate with serving cell equipment.

19. The non-transitory machine-readable medium of claim 18, wherein the serving cell equipment is special serving cell equipment comprising a group of amplifiers implemented in a cascade mode.

20. The non-transitory machine-readable medium of claim 18, wherein, in response to the transmission gain value being set to a maximum value, a broadcast umbra cast by the serving cell equipment to service the aerial user equipment is increased to cover a greater geographic coverage area.

\* \* \* \* \*